S. S. CRIPPEN.
FLUID HOLDER.
APPLICATION FILED DEC. 1, 1911.
1,130,802.
Patented Mar. 9, 1915.
FIG. 1.
FIG. 2.
FIG. 3.
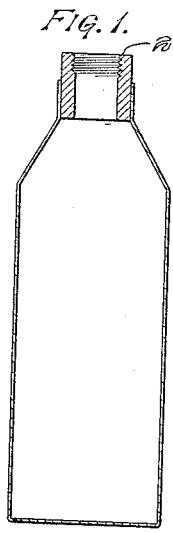
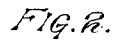
FIG. 4.
FIG. 5.
FIG. 6.
ⓞ ⓔ ⓓ ⓞ ⓑ ①
a  b  c  d  e  f
WITNESSES
A. Andersen.
A. J. Roy.
INVENTOR
Stuart S. Crippen
Edward H. Hales
ATTORNEY.
THE NORRIS PETERS CO., PHOTO-LITHO., WASHINGTON, D.

UNITED STATES PATENT OFFICE.

STUART S. CRIPPEN, OF CHICAGO, ILLINOIS, ASSIGNOR TO L. B. ALLEN COMPANY, OF CHICAGO, ILLINOIS, A CORPORATION OF ILLINOIS.

FLUID-HOLDER.

1,130,802.      Specification of Letters Patent.      Patented Mar. 9, 1915.

Application filed December 1, 1911. Serial No. 663,460.

*To all whom it may concern:*

Be it known that I, STUART S. CRIPPEN, a citizen of the United States of America, and resident of Chicago, Cook county, Illinois, have invented a certain new and useful Improvement in Fluid-Holders, of which the following is a specification.

My invention relates to holders of fluids or semi-fluids and to nozzles therefor.

Among the objects of my invention are the following: To provide a holder of the class described having an internally threaded orifice; to provide an improved removable nozzle therefor having a channel through the length thereof of any suitable character; to provide a nozzle for use in connection with soldering flux, of material such as aluminum that will not easily or under ordinary conditions take solder; and to provide details of improvement tending to increase the efficiency of devices of the above character.

My invention contemplates the foregoing and other useful ends as hereinafter set forth and claimed.

Referring to the accompanying drawings, Figure 1 shows a section-elevation of the holder. Fig. 2 shows a cap; and Fig. 3 a nozzle therefor. Figs. 4 and 5 taken together show another form of the nozzle of Fig. 3 made with a removable tip. The tip is shown in Fig. 5, whereas the trunk is shown in Fig. 4. Fig. 6 is an end view of the tip 5 showing various forms of the channel of tip 5 or of the nozzle of Fig. 3.

Referring to Fig. 1, A is a tube made of some soft material such as lead, into which a soldering flux may be stored. This tube is provided with an orifice 2 threaded internally. When not in use, the tube may be left covered with a threaded cap, Fig. 2, but when it is desired to use the flux for soldering purposes the cap is removed and the nozzle (Fig. 3) is substituted. This nozzle is made of aluminum in order to prevent the usual trouble when nozzles of other material, such as brass or zinc, are used, of having the solder stick to the nozzle. When the tube is exhausted it may be thrown away and the nozzle saved for use with another tube. The nozzle may be made in two parts as indicated in Figs. 4 and 5, and if desired only the tip (Fig. 5) need be made of aluminum. Furthermore, the nozzle or the tip may be channeled in any suitable manner, a number of different methods being shown in Fig. 6.

The advantage of threading the orifice 2 as shown is to save material and to protect the threads.

In ordinary practice the tube is used for squirting the soldering flux while the solder is melted and it is found that with other materials such as brass, etc., for the nozzle, when the nozzle becomes heated the solder sticks thereto, hindering the work.

It will be noted that if desired the nozzle tip of Fig. 5 may be made of aluminum, while the trunk of Fig. 4 may be of some other material.

Referring to Fig. 6, it will be seen that the tip as shown at *b* and *c* is provided with a V shaped channel.

What I claim as my invention is:—

The combination of flux holder of soft collapsible metal, a threaded neck of harder material forced thereon, a nozzle therefor and an aluminum tip therefor attached to said nozzle, said tip being traversed by a V-shaped channel.

Signed by me at Chicago, Cook county, Illinois, this 14th day of November, 1911.

STUART S. CRIPPEN.

Witnesses:
  LUCY HUSAK,
  ARTHUR A. FLETCHER.

Copies of this patent may be obtained for five cents each, by addressing the "Commissioner of Patents, Washington, D. C."